(12) United States Patent
Smith et al.

(10) Patent No.: US 9,378,416 B2
(45) Date of Patent: Jun. 28, 2016

(54) CHECK DATA LIFT FOR CHECK DATE LISTING

(71) Applicant: BANK OF AMERICA CORPORATION, Charlotte, NC (US)

(72) Inventors: Michael Gerald Smith, Fort Mill, SC (US); Brian David Hanson, Charlotte, NC (US); Scott Andrew Johnson, Atlanta, GA (US); Saravana Kumar Govindarajan, Atlanta, GA (US); Michael Scott Hjellming, Cherryville, NC (US); Hyunmo Koo, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 98 days.

(21) Appl. No.: 14/065,966

(22) Filed: Oct. 29, 2013

(65) Prior Publication Data

US 2015/0117748 A1 Apr. 30, 2015

(51) Int. Cl.
*G06K 9/00* (2006.01)

(52) U.S. Cl.
CPC ........ *G06K 9/00469* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 8,162,125 B1 * | 4/2012 | Csulits et al. | 194/206 |
| 2002/0076093 A1 * | 6/2002 | Palmer | G06Q 20/042 382/137 |
| 2007/0288382 A1 * | 12/2007 | Narayanan et al. | 705/45 |
| 2008/0219543 A1 * | 9/2008 | Csulits et al. | 382/135 |
| 2009/0285471 A1 * | 11/2009 | Wall et al. | 382/137 |

* cited by examiner

*Primary Examiner* — Weiwen Yang
(74) *Attorney, Agent, or Firm* — Michael A. Springs; Moore & Van Allen PLLC; Nicholas C. Russell

(57) ABSTRACT

Embodiments of the invention relate to systems, methods, and computer program products for extracting check data and using the check data for determining a disposition of a check. The system, method, and computer program product are configured to: a) receive an image of a check; b) apply an optical character recognition process to at least a portion of the image of the check; c) convert one or more image portions of the at least a portion of the image to text based data based at least partially on the application; d) identify a date of the check based on the text based data obtained from the one or more image portions; e) compare the date of the check to one or more authorization parameters; and f) provide a disposition of the check based on the comparison of the date of the check to the one or more authorization parameters.

17 Claims, 5 Drawing Sheets

CHECK DATA LIFT FOR CHECK DATE LISTING

BACKGROUND

Some financial institutions process millions of checks and other negotiable instruments on a monthly basis. In certain instances, some of the checks that are processed may have dates that do not match a date of deposit for the check. Further, some of the checks that are processed are deposited prior to a postdate of the check and some other checks may be deposited subsequent to an expiration date of the check. As such, determining which checks should not be processed or otherwise require additional attention may present some difficulties to some financial institutions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

An invention for extracting check data and using that check data for determining a disposition of a check is provided. In some embodiments, the invention includes a computer apparatus including a processor and a memory; and a software module stored in the memory, comprising executable instructions that when executed by the processor cause the processor to: a) receive an image of a check; b) apply an optical character recognition process to at least a portion of the image of the check; c) convert one or more image portions of the at least a portion of the image to text based data based at least partially on the application; d) identify a date of the check based on the text based data obtained from the one or more image portions; e) compare the date of the check to one or more authorization parameters; and f) provide a disposition of the check based on the comparison of the date of the check to the one or more authorization parameters.

In some embodiments, the one or more authorization parameters relate to one or more rules and/or policies for determining whether or not a check should be authorized or processed based on the date of the check.

In some embodiments, the one or more authorization parameters comprise a posting date of the check, and wherein the posting date relates at least to the date of deposit of the check.

In some embodiments, the provided disposition of the check includes an expedited processing of the check.

In some embodiments, the provided disposition of the check includes placing a hold on the check and requiring a review and specific validation of the check.

In some embodiments, the invention is configured to flag the image of the check; and provide to an agent of the entity processing the check a notification indicating additional review and specific validation is required for continued processing of the check.

In some embodiments, the invention is configured to: a) compare the date of the check to a posting date of the check; b) determine whether there is a deviation between the date of the check and the posting date of the check; and c) initialize additional processing and review of the check when it is determined that there is a deviation.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1:
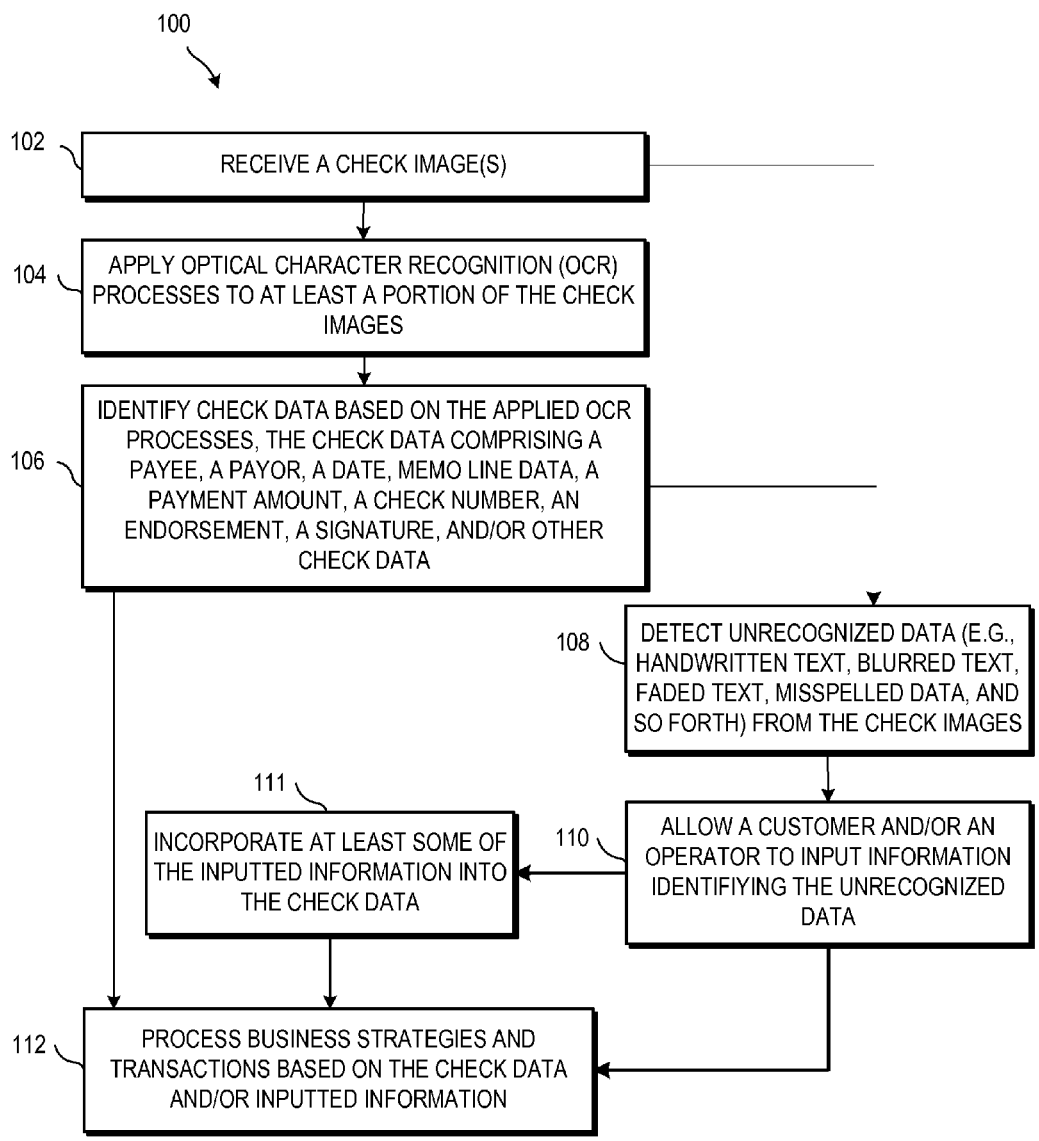
FIG. 1 is a flowchart illustrating a system and method for identifying and extracting check data in accordance with various embodiments.

The embodiments presented herein are directed to systems, methods, and computer program products for detecting and extracting data from financial record images. As presented herein, metadata extracted from the financial record images can be used in processing or automating transactions, implementing business strategies, and providing enhanced online account information to customers. In some embodiments, the images include images of checks or other financial records captured by an account holder or other entity. In particular embodiments, optical character recognition processes and keying operations are utilized to extract the metadata from check or other financial instruments.

The embodiments of the disclosure may be embodied as a system, method, or computer program product. Accordingly, aspects of the present disclosure may take the form of an entirely hardware embodiment, an entirely software embodiment (including firmware, resident software, micro-code, and the like) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that detect and extract specific data from images and that analyze, process, and distribute the metadata are provided. As used herein, the term "financial record" refers to, but is not limited to records associated with financial record data, account data, government data, legal data, identification data, and the like. Exemplary financial records include legal documents, wills, court papers, legal memorandum, leases, birth certificates, checks, receipts, contracts, loan documents, financial statements, bills, and the like. Although the disclosure is directed to financial records, it will be understood that non-financial records such as social communications, advertising, blogs, opinion writing, and the like may also be applicable to the disclosure presented herein. In cases were non-financial records are used, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof.

Referring now to the figures, FIG. 1 provides a flowchart illustrating a process 100 for detecting and extracting data from check images. One or more devices, such as the one or more systems and/or one or more computing devices and/or servers of FIG. 2, can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise at least a portion of the front of the check, at least a portion of the back of the check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. Although check images are described in FIG. 1, it will be understood that any type of financial record image or non-financial record image may be included in process 100.

In some embodiments, each of the check images comprises financial record data. The financial record data includes dates of issuance of financial record, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like. In other embodiments, the check images comprise markings. The markings include, for example, text, numbers, symbols, other characters, lines, shadows, shapes, ink blots, stains, logos, paper tears, smudges, watermarks, any visible marking on the paper check, any visible marking applied electronically to the check image, or any pixel/texel quantity thereof.

Although check images are illustrated in FIG. 1, it will be understood that any type of image (e.g., PDF files, scanned documents, digital photographs with or without letters, numbers, and the like) or financial record may be received in accordance with the embodiments of FIG. 1. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, joint account holder, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert handwritten or printed text and other symbols in the check image to machine encoded text such as text based files that can be edited and searched. The data in the check images can also be extracted and converted into metadata, which can then be used and incorporated into a variety of applications, documents, and processes. In some embodiments, OCR based algorithms incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In additional embodiments, the OCR processes include intelligent character recognition (ICR), which can be used to recognize and extract handwritten portions or other portions of the check image.

In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants (see, e.g., FIG. 4).

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 106, check data is identified based on the applied OCR processes. In some embodiments, the check data comprises a payee, a payor, a date, memo line data, a payment amount, a check number, and endorsement, a signature and/or other check data. The check data, in some embodiments, is identified based on the final objectives of the process 100. As discussed in more detail below, the final objectives of the process 100 can include a variety of business strategies and transactions. In other embodiments, the system of process 100 identifies all recognizable text and markings in the check images. In such cases, the system may further narrow or expand the identified check data as needed.

In further embodiments, the system of process 100 assigns a confidence level to at least a portion of the identified check data. The confidence level includes a pass/fail rating, a graded score, a percentage score, an assigned value, or any other indication that the check data is accurate, relevant, or otherwise acceptable. In this way, any data identified and extracted via the OCR processes and/or any data inputted from an operator or customer can be screened before such data is used in the business strategies and transaction described herein below.

In some embodiments, the confidence level is assigned to the check data based on the number of times the OCR processes is applied to a check image, the quality of the check image, the quality of the identified check data extracted from the check image, whether or not the check data can be verified, and the like. If the check image includes blurred text or has a low pixel count, the text produced by a first round of the OCR processes may be assigned a low confidence level. In such cases, the confidence level may be increased if the check images undergo additional rounds of the OCR processes. In other cases, the system may compare the check data to previously confirmed data to assign the confidence level. For example, a verified signature or other verified data may be compared to the check data. If the check data and the previously confirmed data match, at least a portion of the check data may be assigned a "pass" score. In other instances, the check data may be assigned a "fail" score if the check data and confirmed data do not match. In cases where the confidence level is below a certain level or the check data is otherwise unsatisfactory, the system of process 100 may repeat the same of different OCR processes for at least a portion of a check image, apply a different data identification technique to the check image (e.g., image overlay), adjust the quality of the check image, receive confirmation of the check data from the customer, block further processing of the check images, provide the check images to an analysis group, and so forth.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct such text before applying the OCR processes to increase successfully recognition in the OCR processes or other image processes.

As illustrated at block 110, inputted information identifying the unrecognized data from a customer and/or an operator is received. In some embodiments, an operator is provided with the portions of a check image corresponding to the unrecognized data. The operator can view the unrecognized data to translate the unrecognized data into text and input the translation into a check data repository. In this way, the system "learns" to recognize previously unrecognized data such that when the system reviews the same or similar unrecognized data in the future, such data can be easily identified by reference to the check data repository. In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, at least some of the inputted information is incorporated in the check data. In cases where the OCR processes utilizes a repository that includes manual input such as the check data repository or customer input repository, previously unrecognized data can be matched to definitions submitted by the operator and/or customer.

As illustrated at block 112, business strategies and transactions are processed based on at least one of the check data and the inputted information. Metadata extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

Figure 2:
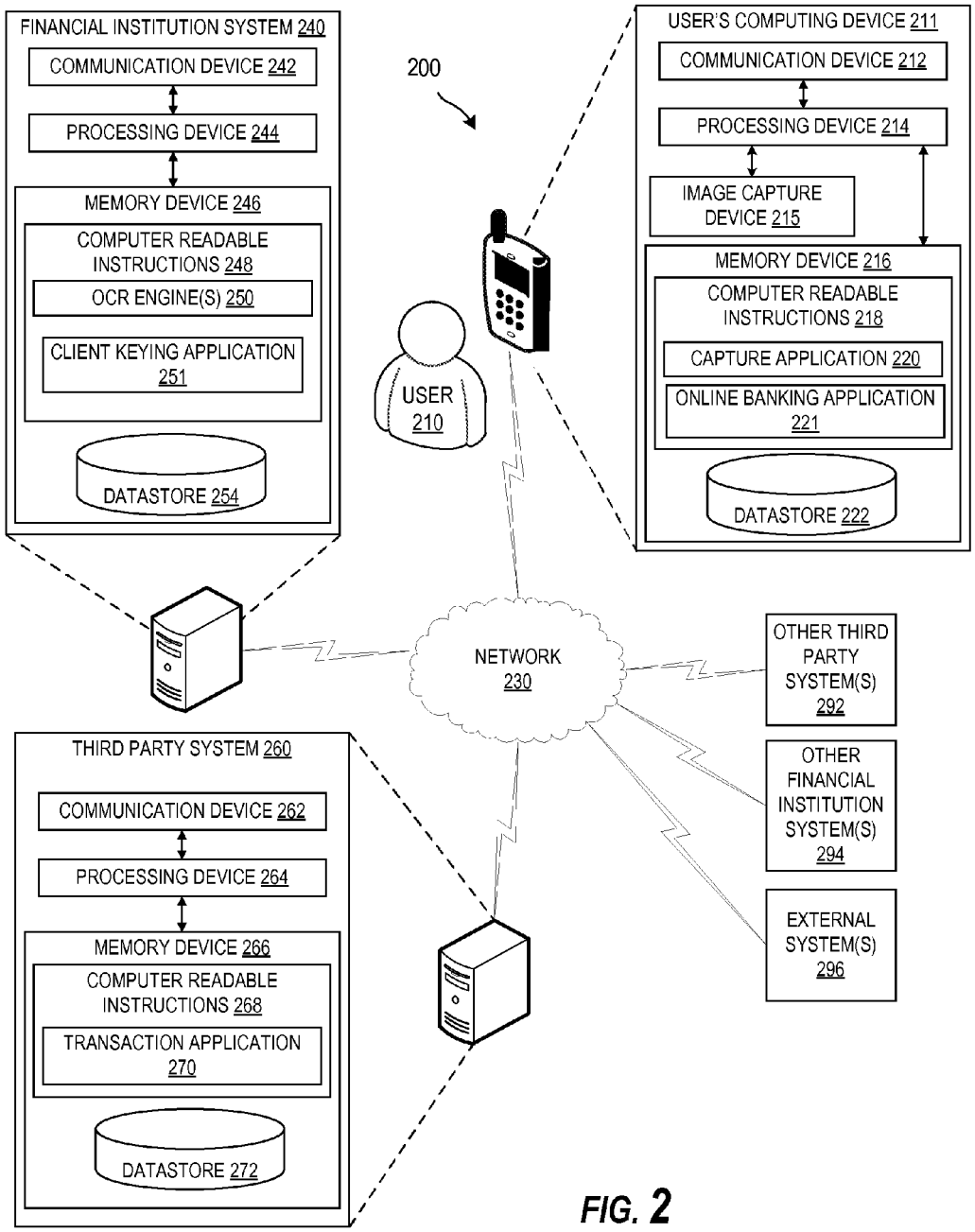
FIG. 2 provides a block diagram illustrating a system and environment for extracting and identifying check data in accordance with various embodiments.

Referring now to FIG. 2, a block diagram illustrates an environment 200 for detecting and extracting check data. The environment 200 includes a computing device 211 of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296. The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The computing device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's computing device 211 includes a communication device 212 and an image capture device 215 (e.g., a camera) communicably coupled with a processing device 214, which is also communicably coupled with a memory device 216. The processing device 214 is configured to control the communication device 212 such that the user's computing device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 262 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the user's computing device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the user's computing device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
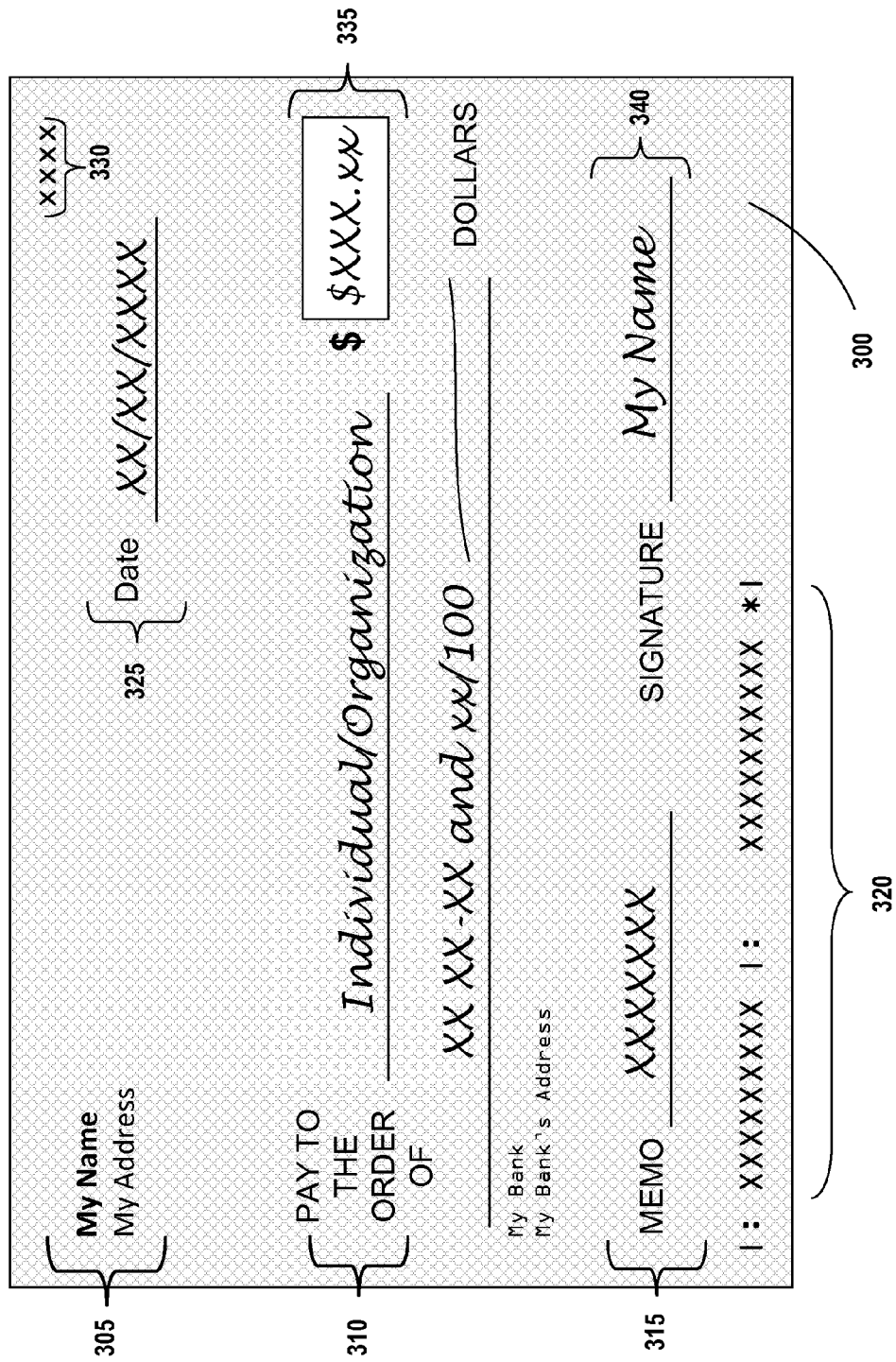
FIG. 3 illustrates an exemplary image of a financial record in accordance with various embodiments.

Referring now to FIG. 3, an exemplary image of a check 300 is illustrated. The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device (e.g., the user's computing device 212 of FIG. 2) may capture an image of the check 300 and transmit the image to a system of a financial institution (e.g., the financial institution system 240 of FIG. 2) via a network. The system may collect the check information from the image of the check 300 and store the check information in a datastore as metadata (e.g., the datastore 254 of FIG. 2). In some embodiments, the pieces of check information may be stored in the datastore individually. In other embodiments, multiple pieces of check information may be stored in the datastore together.

Figure 4:
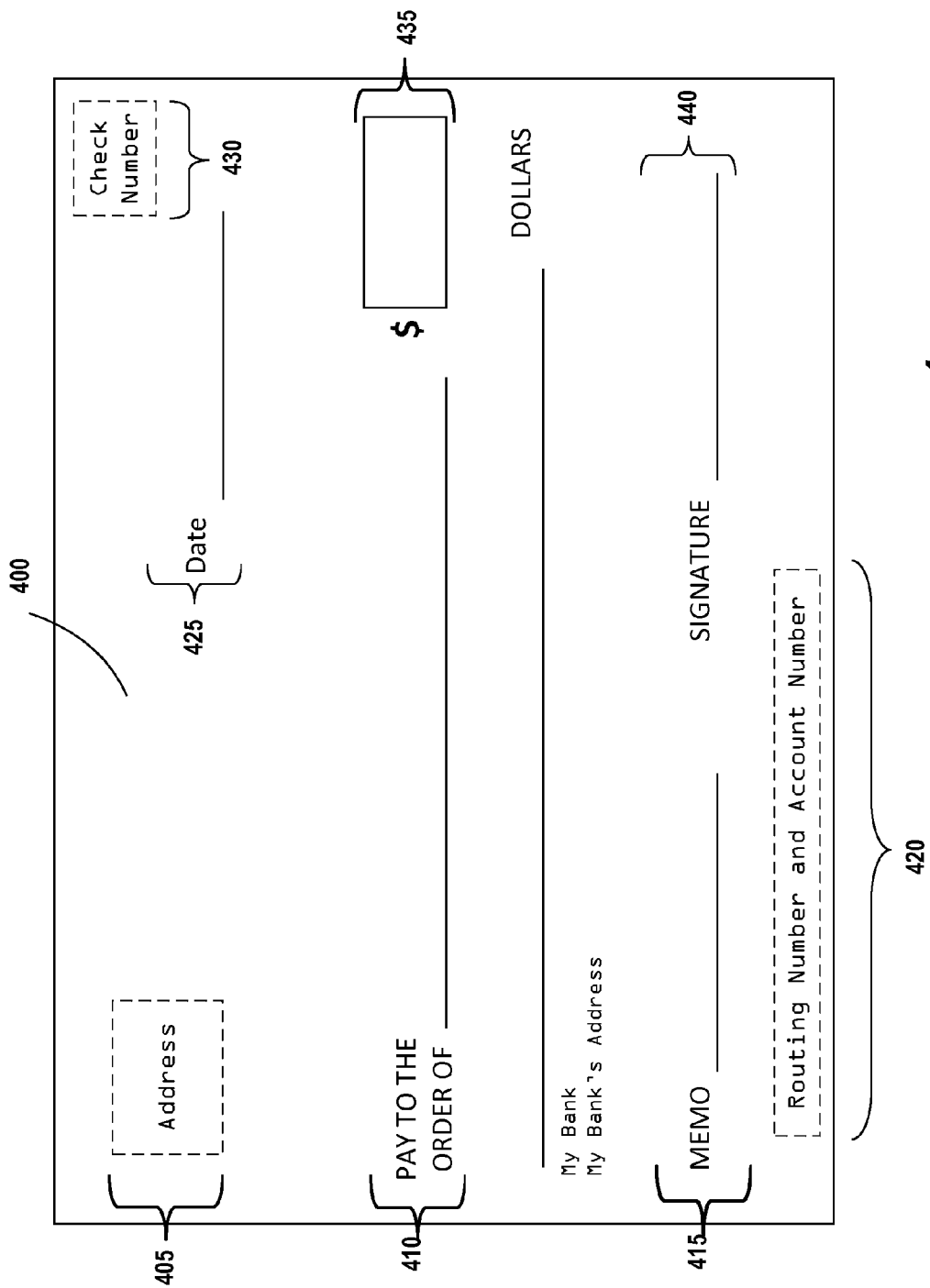
FIG. 4 illustrates an exemplary template of a financial record in accordance with various embodiments.

Referring now to FIG. 4, a check template 400 illustrated. In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

As presented herein, embodiments of the present invention relate to systems and methods for capturing check data from a physical check instrument or an image of the check instrument for determining a disposition of the check instrument. In particular, check data including the date of the check is extracted from the check and is used in determining a disposition of the check. The dispositions of the check may include processing the check, placing a hold on the check, requiring additional processing in addition to standard processing, flagging the check for review, not processing the check, and the like.

Figure 5:
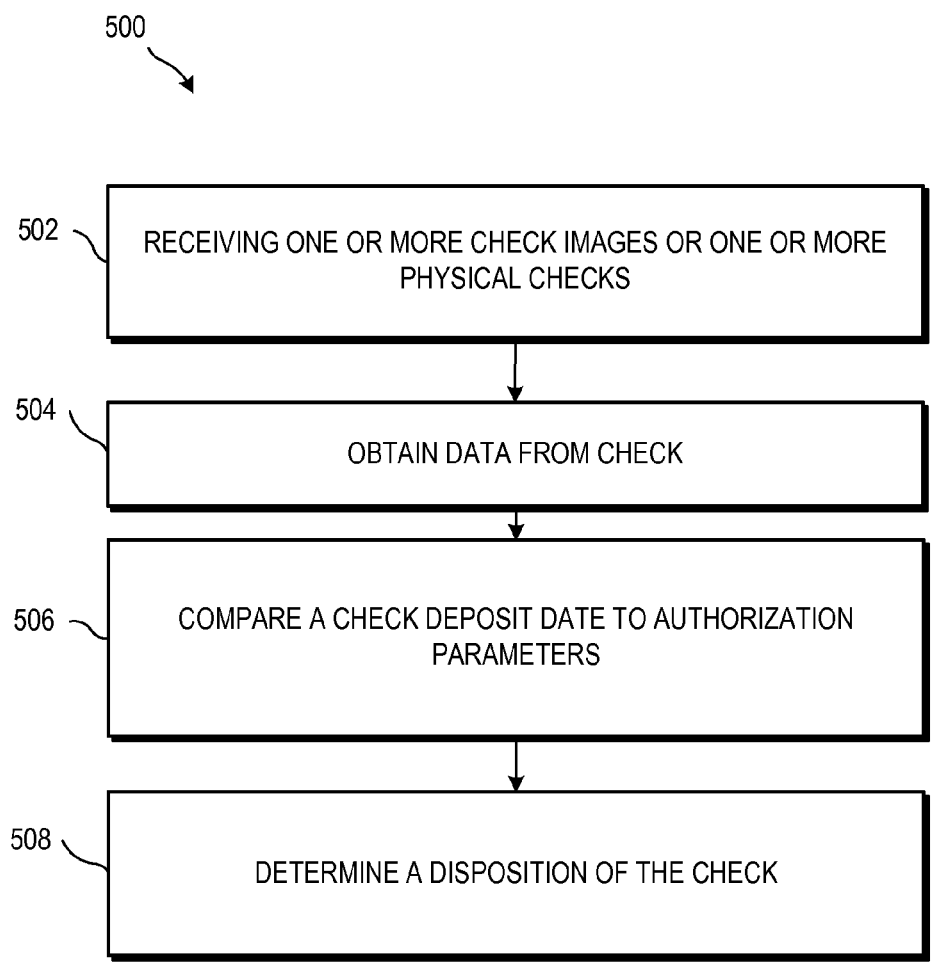
FIG. 5 is a flowchart illustrating a system and method for determining a disposition of a check based on a date of the check, in accordance with various embodiments.

FIG. 5 illustrates a flowchart providing an overview of a process 500 for extracting check data and for using the extracted data for determining a disposition of a check instrument based on a payor-provided date on the check, in accordance with one embodiment of the present invention. One or more devices, such as the one or more computing devices and/or one or more other systems and/or servers of FIG. 2, can be configured to perform one or more steps of the process 500. In some embodiments, the one or more devices performing the steps are associated with a financial institution. In other embodiments, the one or more devices performing the steps are associated with a merchant, business, partner, third party, credit agency, account holder, and/or user.

As illustrated at block 502, a system executing process flow 500 receives one or more check images or one or more physical checks. The check images or physical checks may be received from one or more channels. For example, a physical check may be received at an ATM when deposited by a customer. Or, as another example, a photograph of a check taken by a customer may be received by a server or system of a payee financial institution, which then may also transmitted to and received by a system of a payor financial institution for remittance. It will be understood that check images or physical checks may be received by a system executing process flow 500 in any manner including, but not limited to, the above examples.

At block 504, data from the one or more check images or one or more physical checks is extracted using information extraction technology, such as optical character recognition software. As described within the present application, data may be extracted from the check in a number of novel manners, but, it will be understood that the systems and methods for extracting data from a check should not be limited to the manners or using the systems described within this application.

Continuing with block 504, the system executing process flow 500 extracts from the one or more checks at least a date from the check. For example, in drafting the check, the payor of the check may provide a handwritten or typed date on the check. The date provided on the check may represent the present date (as of the day the payor drafts the check), a future date (post-date), or a past date (a date that has already pasted relative to the date the payor drafts the check). The system is configured to extract the date information and, in some embodiments, convert the date of the check into meta data or other forms of data that is useable by any system of a financial institution that is involved in processing the check.

Additionally, in some embodiments, any information relating to an expiry of the check or period of validity of the check is also extracted. In some embodiments, a check may include type written or handwritten information relating to an expiration of check. For example, a check may include a notation indicating that the check expires (e.g., cannot be cashed, no longer payable, no longer valid, or the like) beyond a ninety (90) day time period beyond the date of the check. So that if the check is dated January 1, 20## then the check would expire and not be valid immediately following the date of April 1, 20##. In other embodiments, a period of validity may be provided on a check. The period of validity is somewhat similar to a standard expiry period of check (e.g., expires 90 days from check date). However, a period of validity of a check includes specific dates for which the check is valid and may be made payable to the payee. For example, a check may have type written notation indicating that the check may only be cashed between January 1, 20## and March 31, 20##, and if not during that time period, then on April 15, 20##. In such an example, any dates that do not fall within the time period or subsequent specified date, the check would be rendered invalid for authorizing a payment to the payee of the check.

As illustrated in block 506, a posting date or deposit date of a check is compared against one or more authorization parameters. In many embodiments, a posting date of a check is the date on which a financial institution's system determines that the check is deposited with the financial institution. In one example, it may be determined that the date on which that the system converts the check into a form that is useable by the processing system is the posting date. In another example, the date on which a physical check document or electronic image is received by a financial institution is considered to be the posting date. It will be understood that the posting date may be determined in various manners and that the posting date may generally refer to a date on which a financial institution considers a check to have posted to a financial account of a user. The one or more authorization parameters generally relate to one or more rules or policies for determining whether or not a check should be authorized or processed based on the date of the check (payor-provided date) or a posting date of the check. In many embodiments, the one or more authorization parameters are modified and/or based at least partially on the extracted check data comprising at least the date of the check. In one example, a deposit date of a check is compared to a predefined expiration date of a check in order to determine whether the check should be authorized for posting to an account of the payee/customer. In such an example, the check may indicate that the check is valid for ninety (90) days beginning from the date of the check. The date of the check may be January 1, 20## and the deposit date of the check may be April 15, 20##. In this example, the system compares the check date of January 1, 20## to the deposit date of the check, April 15, 20##, and determines that the check was deposited beyond the 90 day expiry of the check.

Further regarding block 506, in some embodiments, a date of the check is compared to a posting date of the check. In such an embodiment, the system compares the date of the check to the posting date of the check in order to determine whether or not there is a match between the dates or, at least, a substantial match (the dates vary by only a few days, e.g., 1-7 days). When the system determines that there is a deviation (dates do not match) or substantial deviation between the date of the check and the posting date of the check, the system may provide an alert or notification for initializing additional check verification processes. In some embodiments, upon making a determination that there is a deviation or substantial deviation, the system may automatically trigger additional check verification processes without any alerts or notifications. The additional check verification processes may include comparing the date of the check to the one or more authorization parameters for determining a disposition of the check.

Still regarding block 506, in some embodiments, the one or more authorization parameters relate to one or more client or customer-provided rules, or exceptions, for processing checks drafted by the customer to a payee and for processing checks drafted to the customer as the payee. These additional client-provided rules, in some embodiments, serve as exceptions to the general authorization parameters determining by the entity processing the checks. In such embodiments, the customer provides and/or defines various parameters and rules to be used as authorization parameters for processing checks. In some embodiments, the client may provide a list of merchants or vendors that the client may indicate that any check made payable to the merchants or vendors on the list that is drafted by the client should be paid irrespective of whether or the check satisfies the general authorization parameters. As an example, a vendor of the client may deposit a $1000.00 check for processing, wherein the check is deposited on a date substantially beyond the expiry of the check (e.g., one year after expiry). In such an example, the system would normally flag the check for review or deny the processing of the check. However, in this example, if the name of the vendor is on a client-provided list of vendors or merchants whose checks should be processed regardless of whether the deposit date exceeds an expiry of the check or any other authorization parameter, then the system may note the exception and process the check anyway.

In yet an additional embodiment, a client or customer may provide one or more additional exceptions to the one or more authorization parameters that relate to the authorization of specific check amounts or checks amounts that fall above or below predefined or customer-defined thresholds. As an example, the client may indicate, as a threshold, that any check amounts not exceeding $500.00 that is written by the client to a payee should be processed for payment to the payee irrespective of whether or not the deposit date of the check does not satisfy the general authorization parameters. Similarly, the client may indicate that checks written by the client for more than $100,000.00 should always be cashed whether or not the date of the deposit of the check satisfies the one or more general authorization parameters.

As illustrated at block 508, a disposition of the check is determined. In particular, the disposition of the check is determined based on the comparison of the date of deposit of the check to the one or more authorization parameters. Based on the comparison several dispositions may be determined including: a) Authorization of the check (e.g., post the check to the payee's account), b) Expedited processing to avoid posting the check beyond an expiry date, c) Placing a hold on the check and triggering notifications to the customer and/or an internal agent of the processing financial institution, d) Placing a hold on the check and triggering specific review of the check for validation/authorization, e) Not authorizing the check and returning the check to the payee and/or payor, and the like. Examples of the above dispositions, in application, are described below. The disposition of the check may then be assigned or appended to the check data, so that when a portion of the check processing system receives the check data the system can parse from the check data the appended disposition information. In another embodiment, the determined disposition may be simply provided to the check processing system separately but contemporaneously with the check data.

As a first example, a disposition requiring the authorization of the check may be determined when, based on the comparison of the date of deposit of the check to the one or more authorization parameters, it is determined that the date of the check satisfies the one or more authorization parameters. In other words, the date of the check does not violate any of the requirements of the one or more authorization parameters, where the requirements may include that: a) the date of deposit is within the expiry of the check, b) the date of deposit of the check is in accordance with, at least, one date within a period of validity, c) the date of deposit of the check is not prior to a post-date of the check, and the like.

As another example, a disposition requiring the expedited processing of the check may be determined when, based on the comparison of the date of deposit of the check to the one or more authorization parameters, it is determined that the date of the check is in such proximity to the expiry date of the check such that expedited processing of the check is necessary so that the check posts or is fully processed prior to the expiration date. For example, a check may have a deposit date of April 1, 20## and an expiry date of April 3, 20##. In such an example, it may be determined that any deposit date within three days of the check automatically triggers expedited processing of a check so that the payee or depositing bank that receives the check may properly present the check to the payor or paying bank within sufficient time so that the paying bank will honor the check. It will be understood that any amount of time or range of time (e.g., days, hours, minutes, and the like) may be used for determining an automatic trigger for expedited processing of a check. For example, it may be determined that a date of deposit of a check that is within one to three days of an expiry date triggers expedited processing of the check. In another example, it may be determined that a date of the deposit of a check that is within three to five hours of an expiry date triggers expedited processing of the check.

In yet another example, a disposition requiring the review and specific validation of the check may be determined when, based on the comparison of the date of deposit of the check to the one or more authorization parameters, it is determined that the date of the check does not satisfy one or more of the authorization parameters. In such an instance, an alert and/or notification is sent to an agent of the processing financial institution and/or the payee or payor indicating that review of the check is required and approval. In the notification, an image of the check may be provided together with additional information indicating the elements of the check that should be reviewed and approved.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed:

1. A system for extracting check data and determining a disposition of a check, the system comprising:
 a computer apparatus including a processor and a memory; and
 a software module stored in the memory, comprising executable instructions that when executed by the processor cause the processor to:
  receive an image of a check;
  apply an optical character recognition process to at least a portion of the image of the check;
  convert one or more image portions of the at least a portion of the image to text based data based at least partially on the application;
  identify a date of the check based on the text based data obtained from the one or more image portions, wherein the date of the check is a deposit date of the check;
  compare the date of the check to one or more authorization parameters, wherein the authorization parameters include a posting date of the check, wherein the posting data of the check is the date the check is applied to an account;
 identify a derivation between the date of the check and the posting date of the check; and
  provide, based on the identified derivation being outside an accepted deviation range, a disposition of the check including triggering, automatically upon a predetermined derivation between the date of the check and the posting date of the check, additional check verification processing.

2. The system of claim 1, wherein the one or more authorization parameters relate to one or more rules and/or policies for determining whether or not a check should be authorized or processed based on the date of the check.

3. The system of claim 1, wherein the provided disposition of the check includes an expedited processing of the check.

4. The system of claim 1, wherein the provided disposition of the check includes placing a hold on the check and requiring a review and specific validation of the check.

5. The system of claim 4, wherein the executable instructions further cause the processor to:
   flag the image of the check; and
   provide to an agent of an entity processing the check a notification indicating additional review and specific validation is required for continued processing of the check.

6. The system of claim 1, wherein the executable instructions further cause the processor to:
   compare the date of the check to a posting date of the check;
   determine whether there is a deviation between the date of the check and the posting date of the check; and
   initialize additional processing and review of the check when it is determined that there is a deviation.

7. A computer program product for extracting check data and determining a disposition of a check, the computer program product comprising a non-transitory computer-readable medium, wherein the non-transitory computer-readable medium comprises one or more computer-executable program code portions that, when executed by a computer, cause the computer to:
   receive an image of a check;
   apply an optical character recognition process to at least a portion of the image of the check;
   convert one or more image portions of the at least a portion of the image to text based data based at least partially on the application;
   identify a date of the check based on the text based data obtained from the one or more image portions, wherein the date of the check is a deposit date of the check;
   compare the date of the check to one or more authorization parameters, wherein the authorization parameters include a posting date of the check, wherein the posting data of the check is the date the check is applied to an account;
   identify a derivation between the date of the check and the posting date of the check; and
   provide, based on the identified derivation being outside an accepted deviation range, a disposition of the check including triggering, automatically upon a predetermined derivation between the date of the check and the posting date of the check, additional check verification processing.

8. The computer program product of claim 7, wherein the one or more authorization parameters relate to one or more rules and/or policies for determining whether or not a check should be authorized or processed based on the date of the check.

9. The computer program product of claim 7, wherein the provided disposition of the check includes an expedited processing of the check.

10. The computer program product of claim 7, wherein the provided disposition of the check includes placing a hold on the check and requiring a review and specific validation of the check.

11. The computer program product of claim 7, wherein the computer program code further comprises one or more executable program portions that cause the computer to:
    flag the image of the check; and
    provide to an agent of an entity processing the check a notification indicating additional review and specific validation is required for continued processing of the check.

12. A computer-implemented method for extracting check data and determining a disposition of a check, the method comprising:
    receiving an image of a check;
    applying an optical character recognition process to at least a portion of the image of the check;
    converting, by a computer processing device, one or more image portions of the at least a portion of the image to text based data based at least partially on the application;
    identifying a date of the check based on the text based data obtained from the one or more image portions, wherein the date of the check is a deposit date of the check;
    comparing the date of the check to one or more authorization parameters, wherein the authorization parameters include a posting date of the check, wherein the posting data of the check is the date the check is applied to an account;
    identifying a derivation between the date of the check and the posting date of the check; and
    providing, based on the identified deviation being outside an accepted deviation range, a disposition of the check including triggering, automatically upon a predetermined deviation between the date of the check and the posting date of the check, additional check verification processing.

13. The method of claim 12, wherein the one or more authorization parameters relate to one or more rules and/or policies for determining whether or not a check should be authorized or processed based on the date of the check.

14. The computer-implemented method of claim 12, wherein the provided disposition of the check includes an expedited processing of the check.

15. The method of claim 12, wherein the provided disposition of the check includes placing a hold on the check and requiring a review and specific validation of the check.

16. The method of claim 12, further comprising:
    flagging the image of the check; and
    providing to an agent of an entity processing the check a notification indicating additional review and specific validation is required for continued processing of the check.

17. The method of claim 12, further comprising:
    comparing the date of the check to a posting date of the check;
    determining whether there is a deviation between the date of the check and the posting date of the check; and
    initializing additional processing and review of the check when it is determined that there is a deviation.

* * * * *